United States Patent [19]
Bricker et al.

[11] Patent Number: 5,564,267
[45] Date of Patent: Oct. 15, 1996

[54] RAKING AND PICK-UP TOOL

[75] Inventors: James A. Bricker, Belmont; Alan D. Greenfield, Needham, both of Mass.

[73] Assignee: Leaf-Pro, Inc., Wayland, Mass.

[21] Appl. No.: 438,404

[22] Filed: May 10, 1995

[51] Int. Cl.$^6$ .................................................. A01D 7/06
[52] U.S. Cl. ............................ 56/400.120; 56/400.16; 294/50.8
[58] Field of Search .................. 56/400.12, 400.11, 56/400.16, 400.19; 294/50.5, 50.6, 50.8, 50.9; 7/114, 116

[56] References Cited

U.S. PATENT DOCUMENTS

| | | |
|---|---|---|
| 125,480 | 4/1872 | Newnan. |
| 1,277,998 | 9/1918 | Niemoth. |
| 2,504,943 | 4/1950 | Zifferer ............................... 56/400.12 |
| 2,908,131 | 10/1959 | Ross .................................... 56/400.04 |
| 3,350,886 | 11/1967 | Spencer ............................... 56/400.12 |
| 3,688,484 | 9/1972 | Cox ..................................... 56/400.12 |
| 4,037,394 | 7/1977 | Fiorentino .......................... 56/400.12 |
| 4,057,277 | 11/1977 | Burkholder ..................... 56/400.12 X |
| 4,378,671 | 4/1983 | Gascon ............................... 56/400.12 |
| 4,427,227 | 1/1984 | Haskell ................................ 294/50.9 |
| 4,741,149 | 5/1988 | vom Braucke et al. ............ 56/400.04 |
| 4,791,780 | 12/1988 | Phillips .............................. 56/400.04 |
| 4,991,386 | 2/1991 | Dirksen ............................... 56/400.12 |
| 5,144,199 | 5/1992 | Newcomer .......................... 294/50.8 |

*Primary Examiner*—Terry Lee Melius
*Attorney, Agent, or Firm*—Bromberg & Sunstein

[57] ABSTRACT

A tool formed by a pivotal connection between a first shaft and a second shaft. One shaft has a scooping head such as a shovel or a rake head. The other shaft has a rake head with a plurality of tines having bent distal end portions extending out in a direction away from the scooping head. The rake head may further include flanged portions extending from the distal end of the rake head in a direction toward the scooping head. The pivotal connection may be designed so that it is detachable; and, if so, detachment may be limited to when the shafts are separated in a maximum full open position. The combination tool may be used for raking and picking up leaves or other debris.

27 Claims, 2 Drawing Sheets

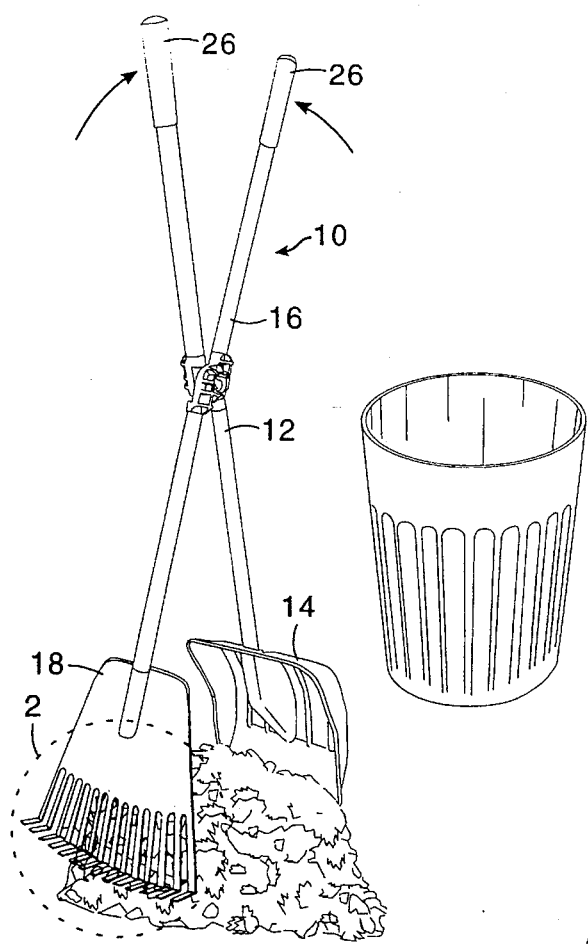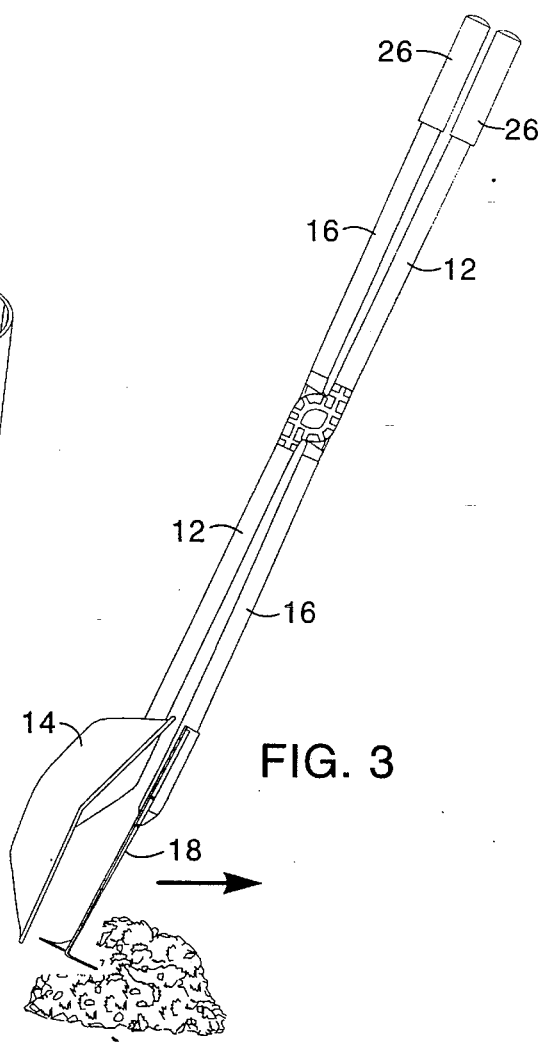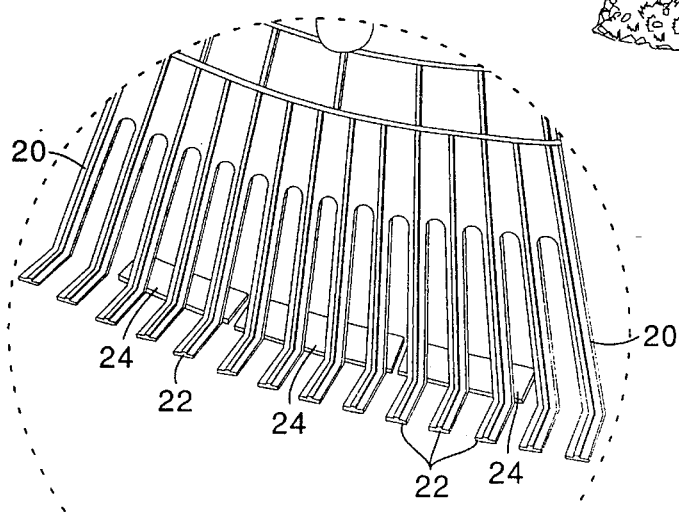
FIG. 1
FIG. 3
FIG. 2

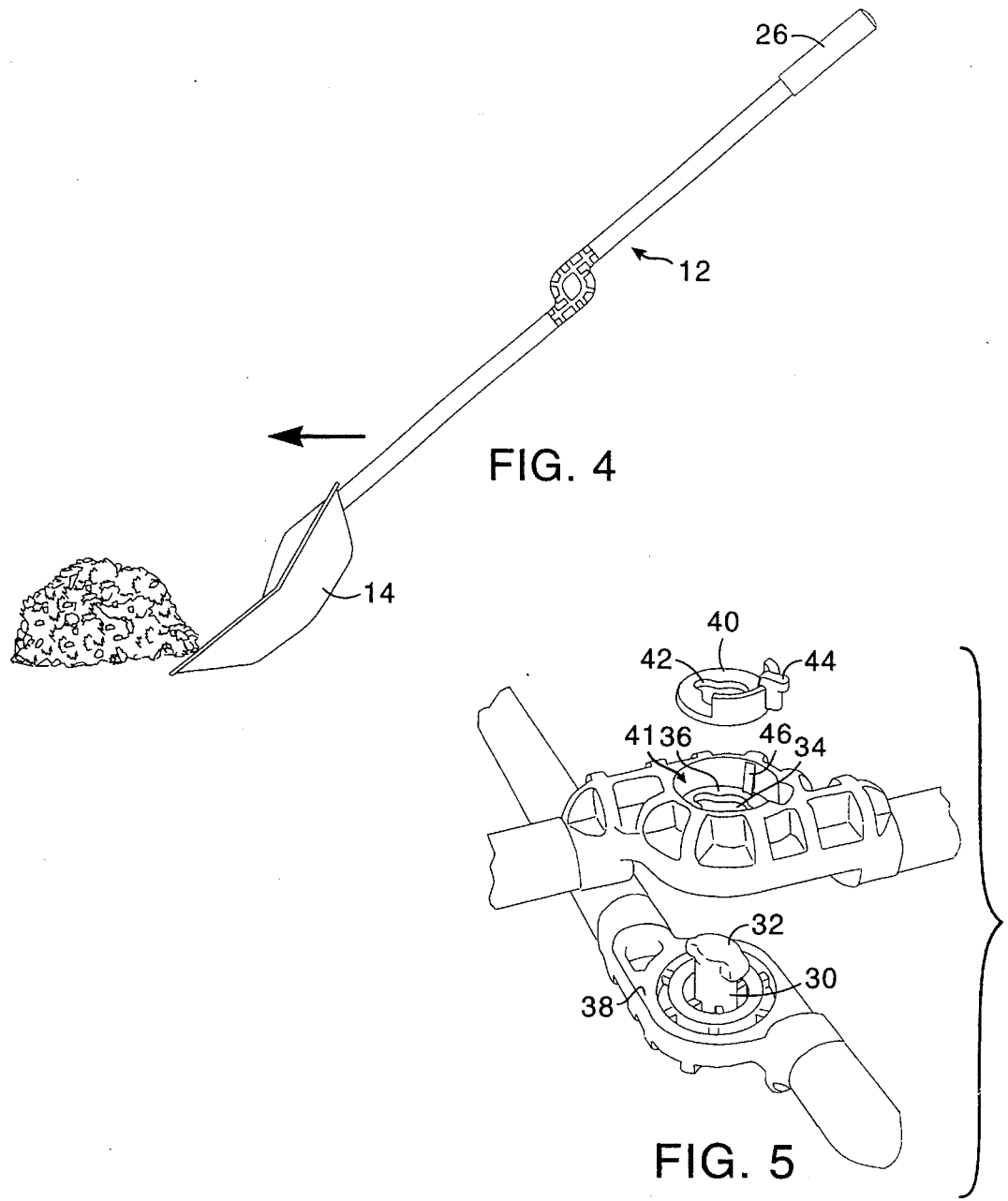
FIG. 4
FIG. 5
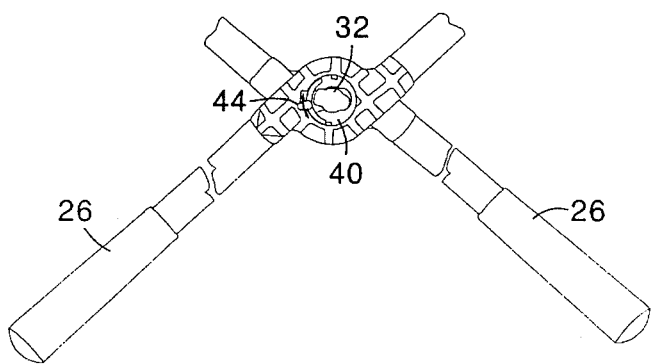
FIG. 6

RAKING AND PICK-UP TOOL

BACKGROUND OF THE INVENTION

The present invention is directed to a raking and pick-up tool, in particular, a combination rake and shovel for use in disposing of leaves.

Residential areas filled with deciduous trees experience the splendor of autumn every year as the leaves change color. However there is a price to pay as autumn progresses and the leaves fall to the ground. Homeowners find themselves saddled with the task of removing the leaves from their lawn. The typical process of removing leaves involves raking or blowing the leaves into piles and then filling bags or cans with the leaves for disposal. The process of leaning down and bending over to pick up leaves from a pile can be difficult work that leads to muscle fatigue and pain.

Numerous tools have been developed which attempt to ease the process of leaf removal. U.S. Pat. No. 2,504,943 (Zifferer) discloses a pickup broom rake with a spring loaded swinging rake head which can cooperate with a fixed rake head to close upon and grip a pile of leaves. U.S. Pat. No. 2,908,131 (Ross) discloses two rakes pivotally attached to one another. Ross describes using the combination rake in a closed position as a rake. The combination tool can be opened and closed to pick up leaves therebetween. U.S. Pat. No. 3,688,484 (Cox) discloses a garden tool with two rakes pivotally connected. The two rake heads of the Cox tool face each other for lifting leaves. U.S. Pat. No. 4,037,397 (Fiorentino) discloses a lawn rake with a second short-handled rake pivoted upon the first rake. The rake heads face each other for picking up debris therebetween.

U.S. Pat. No. 4,378,671 (Gascon) discloses a rake with a rotatable rake head. A second pivotally attached rake head is used for picking up debris with the rake heads facing one another. The combination rake is stored with the rake heads facing the same direction. U.S. Pat. No. 4,991,386 (Dirksen) discloses a pair of rakes pivotally connected for picking up leaves between two facing rake heads.

SUMMARY OF THE INVENTION

The present invention is directed to a combination tool generally used for raking and picking up debris. The tool includes a first shaft with a scoop at its distal end. The scoop may be formed by a shovel, a rake head or the like. A second shaft pivotally connected to the first shaft includes a rake head at its distal end. The distal end portions of the tines of the rake head are directed outwards away from the scoop. Thus when the combination tool is in a closed position, the rake head is available for raking. The rake head may further include flanged portions extending from the distal end of the rake head which project inwards toward the scoop. The flanged portions may assist in grasping leaves or other debris between the scoop and the back of the rake head. The flanged portions may also be useful for packing down leaves that have been piled into a bag or can. By providing a shovel as the scoop, the combination tool may be useful in shovelling up wet leaves from a driveway or sidewalk.

The pivotal connection between the two shafts may be advantageously detachable. In this manner, the combination tool may be separately used as a rake or a shovel. The pivotal connection is designed with a knob connected by a stem to one of the shafts. A slot in the other shaft accommodates the knob head when properly aligned. A washer with a similar slot is positioned between the knob head and the slot of the other shaft. With the slot of the other shaft and the slot of the washer misaligned, the knob cannot make its way through either of the slots thus maintaining the connection. In order to remove the two shafts from each other, the slot in the washer and the slot in the other shaft must be aligned, and then the knob needs to be aligned with both slots. The orientation of the slot is arranged such that alignment for disassembling the shafts is proper only when the two shafts are in approximately a maximal full open position.

The present invention advantageously permits raking a pile of leaves and lifting the leaves into a can or bag without the need for bending over. The same combination tool may be used for either raking or picking up without mechanical adjustment to the tool. The tool further provides the capability of shovelling wet leaves from a hard surface.

Other objects and advantages of the present invention will become apparent during the following description of the presently preferred embodiment of the invention taken in conjunction with the drawings.

BRIEF DESCRIPTION OF THE DRAWINGS

FIG. 1 is an isometric view of the raking and pick-up tool of the present invention in the process of picking up leaves.

FIG. 2 is a blow-up of the rake head of the raking and pick-up tool of FIG. 1.

FIG. 3 is an isometric view of the raking and pick-up tool of FIG. 1 in use as a rake.

FIG. 4 is an isometric view of the shovel portion of the raking and pick-up tool of FIG. 1 separated from the other shaft of the tool.

FIG. 5 is an exploded view of the pivotal attachment mechanism of the raking and pick-up tool of FIG. 1.

FIG. 6 is a partial view of the raking and pick-up tool of FIG. 1 in the maximal open position.

DETAILED DESCRIPTION OF THE PREFERRED EMBODIMENT

Referring now to the drawings, the raking and pick-up tool 10 of the invention is shown in FIG. 1. The tool includes a first shaft 12 with a scoop at its distal end. The scoop of the presently preferred embodiment is a shovel 14. A second shaft 16 is pivotally attached to the first shaft 12. The second shaft has a rake head 18 at its distal end. The rake head 18 includes a plurality of tines 20 at its distal end. The rake head may be seen in greater detail in FIG. 2. At the distal end of each of the tines 20, bent end portions 22 project outwards away from the shovel 14. The bent end portions 22 are used on the working face of the rake head for raking. The rake head 18 can be advantageously used to rake leaves or other debris even with the shovel shaft attached as shown in FIG. 3.

The rake head 18 may further include flange portions extending from the distal end of the rake head but projecting inwards toward the shovel 14. The flange portions 24 may be useful in grasping leaves between a back face of the rake head 18 and the shovel 14 for lifting such leaves or debris into a refuse bag or can. As such, the shovel 14 and the back face of the rake head 18 both act as grasping heads. When a can or bag includes a pile of leaves, the combination tool can be held together and lifted into the can on top of the pile of leaves to compress the pile with the flange portions 24. Of course, the bent end portions 22 and the bottom edge of the shovel will also contribute to packing down a pile of leaves. Thus, it is not necessary to include the flange portions in a raking and pick-up tool of the invention.

At the proximal end of each shaft, there is a handle 26. The ergonomics of the tool may be improved by making each handle 26 from a soft material such as PVC, foam or rubber. The handle fits tightly over the end of each shaft.

The pivotal connection between the shafts and the shafts themselves are preferably designed so that when the shafts are brought together in a closed position as shown in FIG. 3, the first and second shafts are parallel to one another at least between the handle ends and the pivotal connection. For raking with the two parallel shafts, one hand may hold the handle ends while the other hand grasps somewhere along the pair of parallel shafts. Also, picking up of debris is made easier when two hands may be spaced apart along the shafts to lift the debris held between the shovel and the rake head into a can. In accordance with the presently preferred embodiment, each shaft includes two parallel portions offset at the pivotal connection region of the shaft. The construction of a shaft may involve connecting two shafts into a pivot portion. Each shaft portion may be made of equal length to simplify manufacture. An alternative design is to make the entire shaft and pivot portion in a single plastic injection molding operation. The presently preferred embodiment of the invention makes the shafts from hollow steel tubing screwed to opposite ends of an injection molded plastic pivotal connection portion. The rake head and shovel scoop are injection molded plastic in the presently preferred embodiment. The rake head and shovel scoop may be attached to their respect shafts by nuts and bolts, rivets or other suitable attachment method.

The presently preferred pivotal connection between the two shafts of the tool advantageously permits the two shafts to be separated from one another so that each may be used independently. As shown in FIG. 4, the shovel may be used by itself. Of course, the shovel may also be used with the rake head attached. The rake head then facilitates grasping a clump of leaves or debris and depositing it in a can.

Referring now to FIGS. 5 and 6, the pivotal connection of the presently preferred embodiment is shown. The pivotal connection portion of each shaft is formed over only half the thickness of each shaft. Thus when the two shafts are connected at their pivotal connection portions, the shafts rotate within substantially the same plane. By connecting the two shafts in this manner for coplanar rotation, force asserted in bringing the handles together or apart is primarily devoted toward achieving that aim. If the two shafts were not coplanar in rotation, there would be some torque in an unproductive direction created between the two shafts. By providing the shafts in coplanar relation, such torquing is minimized and force directed to separating the tool heads or closing the tool heads is efficiently devoted to that task.

The pivot fulcrum between the shafts is a stem 30. The stem 30 projects out from one of the shafts perpendicular to the shaft to which it is connected. A knob 32 is fixedly attached to the stem 30. The knob 32 is elongated rather than round like the stem 30. The pivotal connection part of the other shaft includes an elongated slot 34 opening which matches the elongated shape of the knob 32. To connect the two shafts together, the slot 34 must be aligned with the knob 32. As presently preferred, this alignment takes place when the two shafts are in a maximal open position as shown in FIG. 6. The maximal open position is reached when the full thickness portions of the shafts butt against each other. Requiring the maximal open position for separating or connecting the shafts thus provides increased assurance that the two shafts will be unable to come apart during normal usage when the shafts are closer together. The slot 34 is formed in a base plate 36. When the two shafts are connected, the base plate 36 of one shaft is sandwiched between the knob 32 and the plate area 38 of the other shaft. This will hold the two shafts securely together so long as they stay out of the maximal open position in which the slot 34 and the knob 32 are aligned.

In order to lock the two shafts of the tool together, a washer 40 is provided. The washer 40 includes a slot 42 which also matches the shape of the knob 32. A tab 44 extends up from the washer for manual rotation of the washer. The washer 40 fits upon the base plate 36. A projection 46 may be provided for holding the washer 40 in place against the base plate 36. The base plate 36 is shown at the bottom of a well 41. The washer 40 may be snapped into the well 41 of the pivotal connection and held against the base plate 36 by the projection 46. For connecting the two shafts, the washer 40 is manually rotated by the tab 44 until the slots of the washer and the shaft are in alignment. The two shafts are brought together and the knob inserted through the slots. The tab 44 is then rotated so that the slot 42 of the washer and the slot 34 of the shaft are skewed out of alignment with one another. In this position, the two shafts are locked together. The knob can no longer fit through the slot 34 of the shaft because the washer is in the way.

To disengage the shafts with the locking washer, it is necessary to rotate the locking washer until the slot 42 of the washer and the slot 34 of the shaft are in alignment. The shafts are opened to the maximal open position. In the maximal open position according to the presently preferred embodiment, the knob 32 is in alignment with the slot 34 of the opposite shaft. With the washer in the unlocked position, the two shafts can be separate from one another.

The rake and pick-up tool 10 may be conveniently used for picking up leaves. Leaves are grasped between the rake head 18 and the shovel 14. The shafts are grabbed so as to lift the leaves into a bag or can. There is no need for the user to bend over. Leaves may be stuffed down into the can by pushing down on the tool handle forcing the distal edges of the tool heads down against the leaves. When the pile of leaves is dispersed, the tool can be used as a rake as shown in FIG. 3 to build up the pile for further grasping and pick-up. In dealing with wet leaves, it may be preferable to use the shovel 14 to scoop up a bunch of leaves for disposal.

Of course, it should be understood that various changes and modifications to the preferred embodiment described above will be apparent to those skilled in the art. Numerous hinged mechanisms may be substituted for the pivotal connection described above. Numerous scoop configurations may achieve the functions of a shovel for grasping and picking up debris between the two shaft heads of the tool. Moreover, the shape of the shafts may be curved or straight instead of the offset parallel portions of the embodiment described above. These and other changes can be made without departing from the spirit and the scope of the invention and without diminishing its attendant advantages. It is therefore intended that such changes and modifications be covered by the following claims.

We claim:

1. A combination tool comprising:

a first shaft having a handle portion at one end and a scooping means at an opposite end; and a second shaft pivotally connected to said first shaft, said second shaft having a handle portion at one end and a rake head at an opposite end having a plurality of tines with bent distal end portions, the rake head being disposed on said shaft so that when the handle portion of said first shaft and the handle portion of said second shaft are brought together the rake head closes against the scooping means with the rake head spread over the scooping means and with the bent distal end portions of the tines extending in a direction away from the scooping means;

wherein the rake head further includes flange portions extending from the distal end of the rake head in a direction toward the scooping means.

2. The combination tool of claim 1 wherein the scooping means comprises a shovel.

3. The combination tool of claim 1 wherein said first shaft and said second shaft are detachably connected at a pivot.

4. The combination tool of claim 3 wherein one of said first and second shafts includes a knob connected by a stem to said one of said first and second shafts and the other of said first and second shafts includes a slot through which the knob can fit when properly aligned, the stem acting as the pivot when said first shaft and said second shaft are connected.

5. The combination tool of claim 4 further comprising a washer having a slot through which the knob can fit when properly aligned, said washer positioned between the knob and the slot in the other of said first and second shafts so that when the slot in said washer and the slot in the other of said first and second shafts are misaligned said first and second shafts cannot be detached.

6. The combination tool of claim 5 wherein the slot in the other of said first and second shafts is oriented so that it is aligned with the knob when the handle portions of said first and second shafts are in a fully separated position with respect to each other.

7. The combination tool of claim 1 wherein said first shaft and said second shaft are parallel from their respective handle portions to the pivotal connection when the handle portions are together in a closed position.

8. The combination tool of claim 1 wherein said first shaft and said second shaft are pivotally connected so that said first shaft and said second shaft both rotate about the pivot substantially within the same plane.

9. A combination tool comprising:

a first shaft having a proximal handle end and a distal end;

a second shaft having a proximal handle end and a distal end;

a pivotal connection attaching said first shaft to said second shaft;

a rake head attached to the distal end of said second shaft and having a plurality of tines with bent distal end portions extending out in a direction away from the distal end of said first shaft; and a grasping head attached to the distal end of said first shaft for grasping things disposed between said rake head and said grasping head when said rake head and said grasping head are brought together;

wherein said rake head further includes flange portions extending from the distal end of said rake head in a direction toward said grasping head.

10. The combination tool of claim 9 wherein said grasping head comprises a shovel.

11. The combination tool of claim 9 wherein said pivotal connection limits separation of the handle end of the first shaft from the handle end of the second shaft to a maximum full open position and whereto said pivotal connection between said first shaft and said second shaft is detachable only when said first and second shafts are approximately in the full open position.

12. The combination tool of claim 9 wherein said pivotal connection includes a knob connected by a stem to one of said first and second shafts and a slot in the other of said first and second shafts through which the knob can fit when properly aligned, the stem acting as the pivot when said first shaft and said second shaft are connected.

13. The combination tool of claim 12 further comprising a washer having a slot through which the knob can fit when properly aligned, said washer positioned between the knob and the slot in the other of said first and second shafts so that when the slot in said washer and the slot in the other of said first and second shafts are misaligned said first and second shafts cannot be detached.

14. The combination tool of claim 12 wherein said first shaft and said second shaft rotate substantially within a single plane about the stem.

15. The combination tool of claim 9 wherein said first shaft and said second shaft are parallel from their respective handle ends to said pivotal connection when the handle ends are together in a closed position.

16. A raking and pick-up tool comprising:

a rake having a first shaft and a rake head having a proximal end attached to an end of the first shaft and a distal end spread over a plurality of tines, the rake head having a working face, a back face, bent end portions projecting out from the working face at the distal end of the rake head and flange portions at the distal end of the rake head extending out from the back face of the rake head; and a grasping head attached to an end of a second shaft pivotally connected to the first shaft so that said grasping head may be brought toward or away from the back face of the rake head such that things may be grasped between the back face of the rake head and said grasping head and released therefrom.

17. The raking and pick-up tool of claim 16 wherein said grasping head is a shovel.

18. The raking and pick-up tool of claim 16 wherein said rake and said grasping head are detachably connected at a pivot.

19. The raking and pick-up tool of claim 18 wherein one of said rake and said grasping head includes a knob connected by a stem to one of said first and second shafts and a slot in the other of said first and second shafts through which the knob can fit when properly aligned, the stem acting as the pivot when said first shaft of said rake and said second shaft of said grasping head are connected.

20. The raking and pick-up tool of claim 19 further comprising a washer having a slot through which the knob can fit when properly aligned, said washer positioned between the knob and the slot in the respective shaft of the other of said rake and said grasping head so that when the slot in said washer and the slot in the respective shaft of the other of said rake and said grasping head are misaligned said rake and said grasping head cannot be detached.

21. The raking and pick-up tool of claim 20 wherein the slot in the respective shaft of the other of said rake and said grasping head is oriented so that it is aligned with the knob when the rake head and the grasping head are in a maximally separated position with respect to each other.

22. A combination rake and shovel comprising:

a rake having a shaft and a rake head having a proximal end attached to an end of the shaft and a distal end spread over a plurality of tines, the rake head having a working face, a back face and bent end portions projecting out from the working face at the distal end of the rake head, the rake head further including flange portions attached to the distal end of the rake head and extending in a direction out from the back face of the rake head;

a shovel having a shaft and a shovel scoop attached to a distal end of the shaft for grasping things disposed between the back face of the rake head and said shovel scoop when the back face of the rake head and said shovel scoop are brought together; and a pivotal connection attaching the shaft of the rake and the shaft of the shovel so that the back face of the rake head faces the shovel scoop.

23. The combination rake and shovel of claim 22 wherein said pivotal connection limits separation of the rake head from the shovel scoop to a maximum full open position and wherein said pivotal connection between the shaft of the rake and the shaft of the shovel is detachable only when said rake and said shovel are approximately in the maximum full open position.

24. The combination rake and shovel of claim 22 wherein said pivotal connection includes a knob connected by a stem to one of said rake and said shovel and a slot in the other of said rake and said shovel through which the knob can fit when properly aligned, the stem acting as the pivot when said rake and said shovel are connected.

25. The combination rake and shovel of claim 24 further comprising a washer having a slot through which the knob can fit when properly aligned, said washer positioned between the knob and the slot in the other of said rake and said shovel so that when the slot in said washer and the slot in the other of said rake and said shovel are misaligned said rake and said shovel cannot be detached.

26. The combination rake and shovel of claim 22 wherein the shaft of said rake and the shaft of said shovel are parallel from their respective proximal ends to said pivotal connection when the proximal ends are together in a closed position.

27. The combination rake and shovel of claim 22 wherein the shaft of said rake and the shaft of said shovel rotate about said pivotal connection substantially within a single plane.

* * * * *